J. ERICKSON.
LINE PROTECTIVE DEVICE.
APPLICATION FILED NOV. 22, 1911.

1,036,818.

Patented Aug. 27, 1912.

WITNESSES
A. Andersen
A. J. Ray

INVENTOR.
John Erickson
By Bulkley & Durand
ATTORNEYS.

UNITED STATES PATENT OFFICE.

JOHN ERICKSON, OF CHICAGO, ILLINOIS, ASSIGNOR TO AUTOMATIC ELECTRIC COMPANY, OF CHICAGO, ILLINOIS, A CORPORATION OF ILLINOIS.

LINE-PROTECTIVE DEVICE.

1,036,818.  Specification of Letters Patent.  Patented Aug. 27, 1912.

Application filed November 22, 1911. Serial No. 661,787.

*To all whom it may concern:*

Be it known that I, JOHN ERICKSON, a citizen of the United States of America, and resident of Chicago, Cook county, Illinois, have invented a certain new and useful Improvement in Line-Protective Devices, of which the following is a specification.

My invention relates to line protective devices, and more particularly to that class of protective devices which employ heat coils for operating the same.

Among the objects of my invention are to devise a protective device in which a more rigid support for the terminals is provided than heretofore in devices of this type.

A further object of my invention is to provide improved means for locking a line spring in engagement with the heat coil, and in providing means whereby this spring may be latched in engagement with the heat coil without moving this coil after it has been placed in position.

These and other objects of my invention will be more readily understood by reference to the accompanying drawing, in which—

Figure 1:
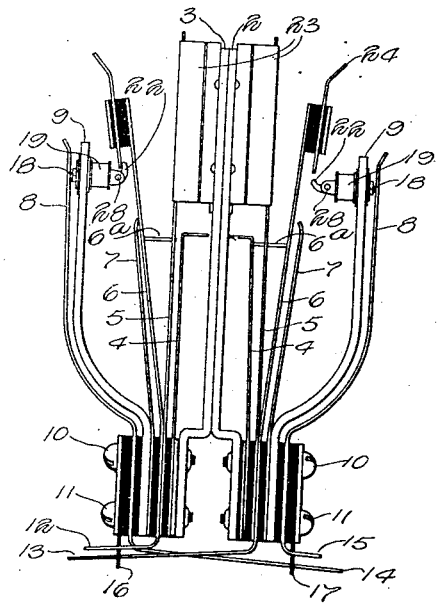
Figure 3:
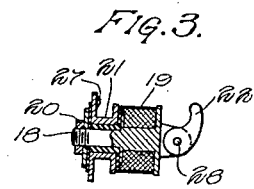
Figure 2:
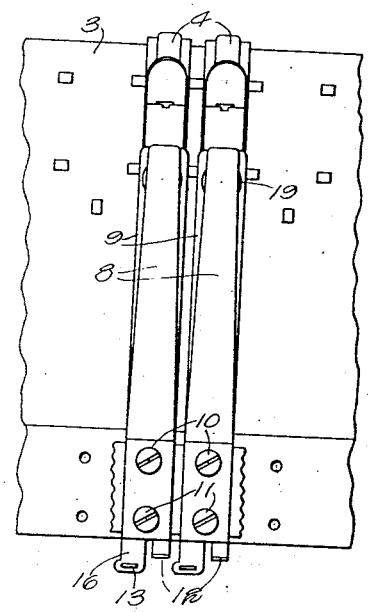

Figure 1 is a plan view of a pair of the protective devices mounted upon opposite sides of a ground plate. Fig. 2 is a side elevation of a portion of the mounting plate showing two of the protective devices in place on the same side of the plate. Fig. 3 is a sectional view of the heat coil.

The mounting plate or ground plate is composed of two plates 2 and 3 riveted together. Mounted upon each side of the ground plate there are a plurality of groups of flexible contact springs 4, 5, 6, 7 and 8 and non-flexible heat coil supports 9. The springs are secured to the mounting plate by means of screws 10 and 11, and are suitably insulated from said plate and from each other by means of insulating washers. The two sets of springs mounted opposite each other preferably belong to the respective sides of the same line circuit. Ordinary carbon lightning arresters 23 are clamped between the springs 5 and the supporting plate. The springs 6 are the line springs and are electrically connected with the springs 5. The springs 7 are electrically connected with the heat coil supports 9. The springs 8 are the switchboard springs and when the heat coils are in place are connected with the supports 9 through the windings of said coils. The springs 6—6 and 8—8 are provided with the terminals 12, 13, 14 and 15. The terminals 13 and 14 are crossed over to opposite sides of the mounting plate so as to bring the two terminals 12 and 13 of the line springs 6 on one side, and the two switchboard terminals 14 and 15 on the other side. In order to prevent movement of the terminals 13 and 14, the insulating washers 16 and 17 are each provided with a downwardly projecting portion provided with an opening which fits snugly over its respective terminal. The washers being held rigid by the screws 10 and 11 hold the terminals 13 and 14 securely in place.

Referring especially to Fig. 3, the heat coil shown therein comprises a pin 18 upon which there is mounted a coil of resistance wire 19. Clamped between the nut 20 and the end of the coil 19, but entirely insulated from the pin 18, there is a grooved collar 21. One end of the pin 18 is split and a small catch or pawl 22 is rotatably mounted between the two parts thereof by means of a small pin 28. The catch 22 is normally rigidly held in its upright position, as shown in Fig. 3, by means of soft solder or other fusible material, by means of which it is soldered to the pin 18. The heat coil is mounted in the protector by slipping the grooved collar 21 down into a slot in the end of the support 9. The spring 8 then bears against the end of the pin 18. One terminal of the winding 19 of the heat coil is connected with the collar 21 and the other terminal is connected to the pin 18, so that when the coil is in place there is a complete electrical connection from the support 9 through the collar 21, winding 19 and the pin 18 to the switchboard spring 8. Slidably mounted upon the end of the spring 6, but insulated therefrom, is a strip 24.

In order to set the device the heat coil is put in place, the strip 24 is raised and the spring 6 forced outward until the strip 24 may be pushed down behind the catch 22 on the heat coil and thus hold the spring 6 in the position shown in the left-hand portion of Fig. 1. In this position the spring 6 contacts with the spring 7, whereby a connection is completed between the line spring 6 and the switchboard spring 8 through the winding of the heat coil. Thus, any current flowing to the switchboard from the line must pass through the winding of the heat coil. When an abnormal current flows over this circuit for an undue length of time, the heat coil heats up and softens the fusible material which holds the catch 22 and permits said catch to rotate to a horizontal position, thereby releasing the spring 6 and allowing it to move inward by its own tension and break contact with the spring 7, thereby disconnecting the line from the switchboard. When the spring 6 flies inward a projection 6ª thereon which passes through an opening in the spring 5 presses the spring 4 down onto the ground plate, thereby grounding both the line spring 6 and the spring 4. The spring 4 may be connected to the usual alarm circuit to give a signal when a heat coil operates.

After a heat coil has operated, it may be restored to normal condition again by being heated, preferably by passing current through its own winding until the fusible material is softened. Then the catch 22 may be restored to its upright position and the fusible material again allowed to cool.

In order to guide the heat coil in the slot in the support 9 so that the catch 22 will stand upright, the collar 21 is provided with the lugs 27, one on each side of the vertical center line, which serve to guide the heat coil into position and prevent it from turning after it is in place.

While I have illustrated one embodiment of my invention, it will be understood that I do not wish to limit myself to such specific construction.

What I claim as my invention is:—

1. In a line protective device, a mounting plate, a terminal member mounted on one side of said plate, said terminal member being crossed over to the opposite side of said plate, and an insulating washer supported upon said mounting plate and threaded over the end of said terminal to stiffen the same.

2. In a line protective device, a mounting plate, terminal members mounted on said plate, some of said terminal members being crossed over to the opposite side of said plate through space to arrange like terminals together, and insulating washers mounted upon said terminal plate and threaded over said crossed over terminals to stiffen the same.

3. In a line protective device, a ground plate, spring members suitably mounted thereon, a heat coil normally engaged by one of said spring members, a catch mounted upon said heat coil, and a slidable member carried by one of said spring members and engaging with said catch, whereby said heat coil controls said spring members.

4. In a line protective device, a mounting plate, suitable spring members mounted upon said plate, a heat coil carried by said mounting plate, one of said spring members normally engaging said heat coil, a catch mounted upon said heat coil, and a slidable member carried by one of said spring members and adapted to engage with said catch, whereby said spring member may be locked in engagement with said heat coil without moving the coil after it has been placed in position.

5. In a line protective device, a heat coil provided with a suitable catch, a spring member, a sliding strip carried upon the end of said spring member, said sliding strip adapted to engage with said catch for locking said spring member in engagement with said heat coil, and means for sliding said spring member up and down, whereby the spring member may be latched in engagement with the heat coil without moving the coil after it has been placed in position.

6. In a line protective device, a mounting plate, a plurality of spring members carried thereby, a rigid member likewise carried by said mounting plate, a heat coil mounted on said rigid member and normally engaging one of said spring members, a catch mounted upon said heat coil, and a slidable member carried by another of said spring members and adapted to engage said catch, whereby said spring member is locked in engagement with said heat coil.

Signed by me at Chicago, Cook county, Illinois, this 17th day of November, 1911.

JOHN ERICKSON.

Witnesses:
ARTHUR J. RAY,
E. D. FALES.